(12) United States Patent
Briechle et al.

(10) Patent No.: US 9,206,348 B2
(45) Date of Patent: Dec. 8, 2015

(54) PROCESS FOR MINERAL OIL PRODUCTION FROM MINERAL OIL DEPOSITS WITH HIGH DEPOSIT TEMPERATURE

(75) Inventors: Sebastian Briechle, Frankenthal (DE); Tillmann Faust, Weisenheim Am Sand (DE); Stephan Freyer, Neustadt (DE); Rajan Hollmann, Bad Essen (DE); Tobias Käppler, Maxdorf (DE); Bernd Leonhardt, Kassel (DE); Julia Kristiane Schmidt, Heidelberg (DE); Benjamin Wenzke, Hamburg (DE); Foppe Visser, Baunatal-Grossenritte (DE)

(73) Assignee: WINTERSHALL HOLDING GMBH, Kassel (DE)

( * ) Notice: Subject to any disclaimer, the term of this patent is extended or adjusted under 35 U.S.C. 154(b) by 797 days.

(21) Appl. No.: 13/371,880

(22) Filed: Feb. 13, 2012

(65) Prior Publication Data
US 2012/0205099 A1 Aug. 16, 2012

Related U.S. Application Data

(60) Provisional application No. 61/443,276, filed on Feb. 16, 2011.

(51) Int. Cl.
*C09K 8/588* (2006.01)
(52) U.S. Cl.
CPC .................................... *C09K 8/588* (2013.01)
(58) Field of Classification Search
None
See application file for complete search history.

(56) References Cited

U.S. PATENT DOCUMENTS

| 3,372,749 | A | * | 3/1968 | Williams | 166/270.1 |
| 3,841,401 | A | * | 10/1974 | Restaino et al. | 166/247 |
| 4,347,146 | A | * | 8/1982 | Abdo | 507/211 |
| 4,457,372 | A | * | 7/1984 | Doster et al. | 166/272.3 |
| 4,908,141 | A | * | 3/1990 | Loza et al. | 507/240 |

(Continued)

FOREIGN PATENT DOCUMENTS

| CA | 832 277 A | 1/1970 |
| CA | 2063490 A1 | 9/1992 |

(Continued)

OTHER PUBLICATIONS

International Search Report mailed May 22, 2012—PCT/EP2012/052557, Feb. 15, 2012.

(Continued)

*Primary Examiner* — Alicia Bland
(74) *Attorney, Agent, or Firm* — Drinker Biddle & Reath LLP

(57) ABSTRACT

A two-stage process for mineral oil production from mineral oil deposits with a deposit temperature of more than 70° C. and a salinity of 20 000 ppm to 350 000 ppm, in which an aqueous formulation comprising at least one glucan with a β-1,3-glycosidically linked main chain, and side groups β-1,6-glycosidically bonded thereto and having a weight-average molecular weight $M_w$ of $1.5*10^6$ to $25*10^6$ g/mol, are injected into a mineral oil deposit through at least one injection borehole and crude oil is withdrawn from the deposit through at least one production borehole. The aqueous formulation is prepared in two stages, by first preparing an aqueous concentrate of the glucan, and diluting the concentrate on site with water to the use concentration.

27 Claims, 7 Drawing Sheets

(56) References Cited

U.S. PATENT DOCUMENTS

2010/0006283 A1* 1/2010 Collins et al. ............ 166/261
2011/0151517 A1 6/2011 Therre et al.

FOREIGN PATENT DOCUMENTS

| CA | 1329159 C | 5/1994 |
| DE | 38 38 352 | 5/1989 |
| DE | 4012238 A1 | 1/1991 |
| EP | 271907 A2 | 6/1988 |
| EP | 504673 A1 | 9/1992 |
| WO | WO-03016545 A2 | 2/2003 |

OTHER PUBLICATIONS

Udo Rau, "Biosynthese, Produktion und Eigenschaften von extrazellulären Pilz-Glucanen", Habilitationsschrift, Technische Universität Braunschweig, Shaker Verlag Aachen 1997, pp. 105-136.

Udo Rau, Andreas Haarstrick and Fritz Wagner, Chem. Ing. Tech. 64(6) (1992), pp. 576/577.

\* cited by examiner

PROCESS FOR MINERAL OIL PRODUCTION FROM MINERAL OIL DEPOSITS WITH HIGH DEPOSIT TEMPERATURE

CROSS-REFERENCE TO RELATED APPLICATION

This application claims the benefit of U.S. Provisional Application Ser. No. 61/443,276 filed Feb. 16, 2011, the entire contents of which are incorporated herein by reference in its entirety.

FIELD OF THE INVENTION

The present invention relates to a two-stage process for mineral oil production from mineral oil deposits with a deposit temperature of more than 70° C. and a salinity of 20 000 ppm to 350 000 ppm, in which an aqueous formulation comprising at least one glucan with a β-1,3-glycosidically bonded main chain, and side groups β-1,6-glycosidically bonded thereto and having a weight-average molecular weight $M_w$ of $1.5*10^6$ to $25*10^6$ g/mol, are injected into a mineral oil deposit through at least one injection borehole and crude oil is withdrawn from the deposit through at least one production borehole. The aqueous formulation is prepared in two stages, by first preparing an aqueous concentrate of the glucan, and diluting the concentrate on site with water to the use concentration.

BACKGROUND

In natural mineral oil deposits, mineral oil is present in the cavities of porous reservoir rocks which are sealed toward the surface of the earth by impermeable top layers. The cavities may be very fine cavities, capillaries, pores or the like. Fine pore necks may, for example, have a diameter of only approx. 1 µm. As well as mineral oil, including fractions of natural gas, a deposit comprises water with a greater or lesser salt content.

In mineral oil production, a distinction is drawn between primary, secondary and tertiary production.

In primary production, after commencement of drilling of the deposit, the mineral oil flows of its own accord through the borehole to the surface owing to the autogenous pressure of the deposit. According to the deposit type, however, usually only approx. 5 to 10% of the amount of mineral oil present in the deposit can be produced by means of primary production; thereafter, the autogenous pressure is no longer sufficient for production.

After primary production, secondary production is therefore used. In secondary production, in addition to the boreholes which serve for the production of the mineral oil, known as the production boreholes, further boreholes are drilled into the mineral oil-bearing formation. These are known as injection boreholes, through which water and/or steam is injected into the deposit, in order to maintain the pressure or to increase it again. As a result of the injection of the water, the mineral oil is gradually forced through the cavities in the formation, proceeding from the injection borehole, in the direction of the production borehole. However, this works only for as long as the cavities are completely filled with oil and the more viscous oil is pushed onward by the water. As soon as the mobile water breaks through cavities, it flows on the path of least resistance from this time onward, i.e. through the channel formed between the injection boreholes and the production boreholes, and no longer pushes the oil onward. By means of primary and secondary production, generally only approx. 30 to 35% of the amount of mineral oil present in the deposit can be produced.

It is known that the mineral oil yield can be enhanced further by measures of tertiary oil production. Tertiary oil production includes processes in which suitable chemicals are used as assistants for oil production. This includes what is called "polymer flooding". Polymer flooding involves injecting an aqueous solution of a thickening polymer into the mineral oil deposit through the injection boreholes instead of water. As a result of the injection of the polymer solution, the mineral oil is forced through said cavities in the formation from the injection borehole proceeding in the direction of the production borehole, and the mineral oil is finally produced through the production borehole. Due to the elevated viscosity of the polymer solution, which is matched to the viscosity of the mineral oil, the polymer solution is thus able to break through cavities at least not as easily as is the case for pure water, if at all. Parts of the deposit not accessible to the water are reached by the polymer solution.

For polymer flooding, a multitude of different thickening water-soluble polymers have been proposed, both synthetic polymers, for example polyacrylamide or copolymers of acrylamide and other monomers, especially monomers having sulfo groups, and polymers of natural origin, for example glucosylglucans, xanthans or diutans.

Glucosylglucans are branched homopolysaccharides formed from glucose units. Homopolysaccharides formed from glucose units are called glucans. The branched homopolysaccharides mentioned have a main chain formed from β-1,3-bonded glucose units, of which—viewed statistically—about every third unit is β-1,6-glycosidically bonded to a further glucose unit. Glucosylglucans are secreted by various fungal strains, for example by the filamentous basidiomycete *Schizophyllum commune*, which, during growth, secretes a homopolysaccharide of the structure mentioned with a typical molecular weight $M_w$ of approx. 5 to approx. $25*10^6$ g/mol (trivial name: *schizophyllan*). Mention should also be made of homopolysaccharides of the structure mentioned secreted by *Sclerotium rolfsii* (trivial name: *scleroglucans*).

The production of such glucosylglucans is disclosed, for example, in EP 271 907 A2, EP 504 673 A1, DE 40 12 238 A1 and WO 03/016545, and they are produced specifically by fermenting suitable fungal strains while stirring and venting, and removing the polysaccharide formed.

Our prior application EP 09179716.7 discloses a process for producing concentrated glucosylglucan solutions with concentrations of more than 3 g/l.

CA 832 277 A discloses the use of aqueous solutions of glucosylglucans for polymer flooding. The aqueous solutions used have, at a concentration of 1% by weight, a viscosity at 24° C. of at least 500 mPa*s, and the concentration of the glucosylglucans is 0.005 to 1% by weight, preferably 0.01 to 0.3% by weight. The solutions used may additionally comprise further components, for example surfactants, biocides or bases, for example alkali metal hydroxides.

EP 271 907 A1 discloses a process for producing glucosylglucans, fungal strains particularly suitable for this purpose, and the use of such glucosylglucans for tertiary mineral oil production. The document further discloses measurements of the viscosity of aqueous solutions in saline water at temperatures of 25° C. to 60° C.

Udo Rau, Andreas Haarstrick and Fritz Wagner, *Chem. Ing. Tech.* 64(6) (1992), pages 576/577 propose the use of *schizophyllan* solutions for polymer flooding of mineral oil deposits with high temperature and salinity, without describing details of a process.

Udo Rau, "*Biosynthese, Produktion and Eigenschaften von extrazellulären Pilz-Glucanen*" [Biosynthesis, production and properties of extracellular fungal glucans] in *Berichte aus der Biotechnologie*, Shaker Verlag, Aachen, 1997, pages 106 ff mentions that *schizophyllan* solutions have thermal stability up to 135° C. and should therefore be suitable for tertiary mineral oil production in deep deposits, for example in the North Sea. It is also mentioned that *schizophyllan* has a reversible decrease in viscosity up to shear rate of 40 000 s$^{-1}$. It is additionally pointed out that the viscosity of *schizophyllan* solutions is barely influenced by the presence of alkali metal and alkaline earth metal ions.

BRIEF SUMMARY

It was an object of the invention to provide an improved process for polymer flooding for deposits with deposit temperatures of at least 70° C. using glucosylglucans.

Accordingly, a process has been found for mineral oil production from deposits with a deposit temperature $T_L$ of at least 70° C., said deposit comprising, as well as oil, deposit water with a salinity of 20 000 ppm to 350 000 ppm, and said oil having a viscosity $\eta_o$ (measured at $T_L$) of at least 3 mPa*s by injecting an aqueous formulation (F) comprising at least one glucan with a β-1,3-glycosidically bonded main chain, and side groups β-1,6-glycosidically bonded thereto and having a weight-average molecular weight $M_w$ of 1.5*10$^6$ to 25*10$^6$ g/mol into a mineral oil deposit through at least one injection borehole, and withdrawing crude oil from the deposit through at least one production borehole, wherein the process comprises at least the following process steps:

(1) providing a concentrate (K) of the glucan in water with a concentration of more than 3 g/l to 30 g/l, (2) preparing the aqueous formulation (F) by diluting the concentrate (K) provided in step (1) on site with water to a glucan concentration of 0.05 g/l to 3 g/l, with the proviso that the concentration is selected such that the viscosity $\eta_F$ (measured at 7 s$^{-1}$ and $T_L$) of the aqueous formulation (F) is at least 3 mPa*s, the viscosity $\eta_F$ being selected in comparison to the viscosity $\eta_{oil}$ (measured at $T_L$) such that $\eta_F \leq \eta_{oil}$, and (3) injecting the aqueous formulation (F) into the mineral oil formation and withdrawing crude oil through at least one production borehole.

DETAILED DESCRIPTION OF THE PREFERRED EMBODIMENTS

Figure 1:
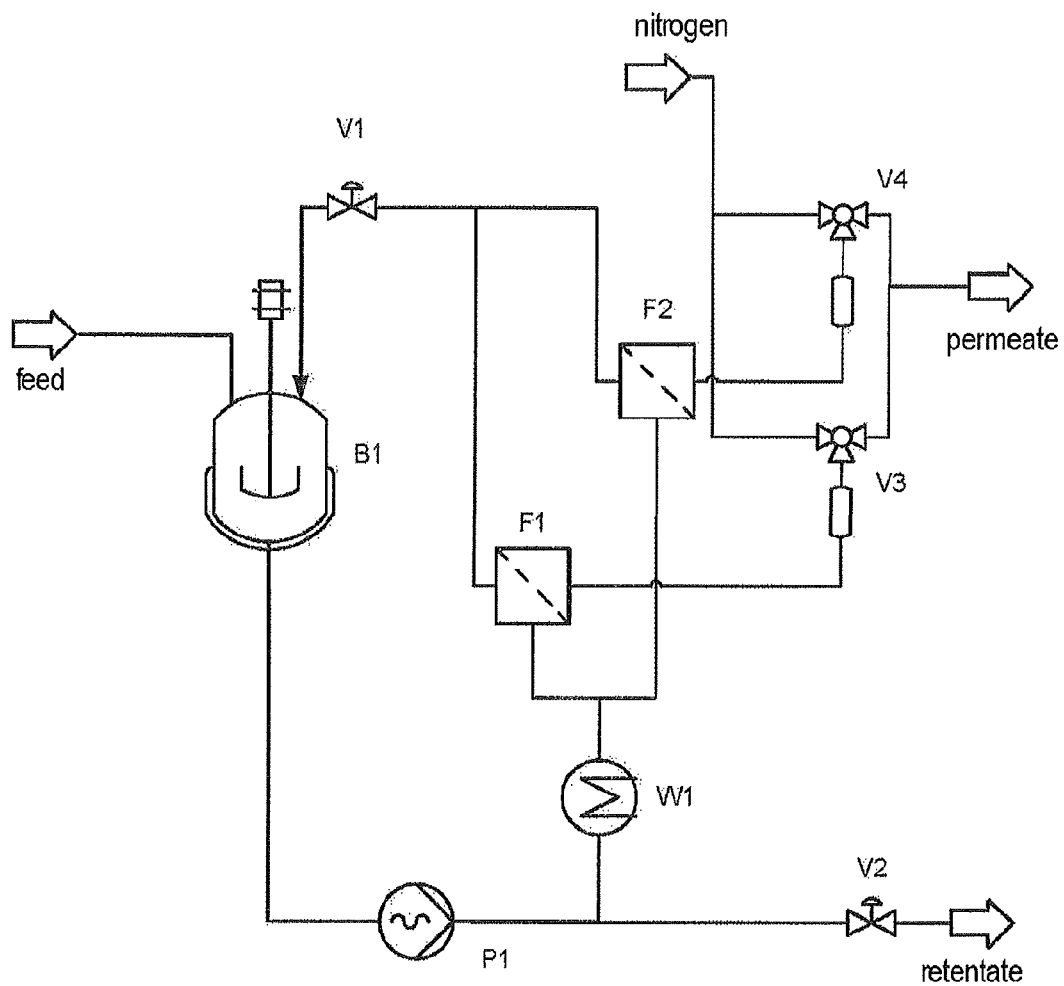
FIG. 1 is a schematic diagram of the apparatus used to prepare the glucan P1.

With regard to the invention, the following should be stated specifically:

To execute the process according to the invention, at least one production borehole and at least one injection borehole are sunk into the mineral oil deposit. In general, a deposit is provided with a plurality of injection boreholes and with a plurality of production boreholes.

To execute the process according to the invention for mineral oil production, an aqueous formulation (F) at least comprising a glucan with a β-1,3-glycosidically bonded main chain and side groups β-1,6-glycosidically bonded thereto is used, and injected into a mineral oil deposit through at least one injection borehole.

In this context, the term "mineral oil" of course does not mean single-phase oil, but rather the term also comprises the customary crude oil-deposit water emulsions. As a result of the pressure generated by the formulation injected, called the "polymer flood", the mineral oil flows in the direction of the production borehole and is produced through the production borehole.

The deposit temperature of the mineral oil deposit to which the process according to the invention is applied is, in accordance with the invention, at least 70° C., especially 70° C. to 150° C., preferably 80° C. to 145° C., more preferably 90° C. to 140° C., even more preferably 100 to 135° C. and, for example 105° C. to 130° C.

Such comparatively high deposit temperatures are encountered in particular in the case of comparatively deep mineral oil deposits.

It is clear to the person skilled in the art that a mineral oil deposit can also have a certain temperature distribution. The deposit temperature mentioned relates to the region of the deposit between the injection and production boreholes, which is covered by the polymer flooding. Methods for determining the temperature distribution of a mineral oil deposit are known in principle to those skilled in the art. The temperature distribution is generally undertaken from temperature measurements at particular sites in the formation in combination with simulation calculations, and the simulation calculations take into account factors including amounts of heat introduced into the formation and the amounts of heat removed from the formation.

The process according to the invention can be employed especially in the case of mineral oil deposits with an average permeability of 10 mD to 4 D, preferably 100 mD to 2 D and more preferably 200 mD to 1 D. The permeability of a mineral oil formation is reported by the person skilled in the art in the "darcy" unit (abbreviated to "D" or "mD" for "millidarcies"), and it can be determined from the flow rate of a liquid phase in the mineral oil formation as a function of the pressure difference applied. The flow rate can be determined in core flooding tests with drill cores taken from the formation. Details on this subject can be found, for example, in K.

Weggen, G. Pusch, H. Rischmüller in *"Oil and Gas"*, pages 37 ff, *Ullmann's Encyclopedia of Industrial Chemistry, online version*, Wiley-VCH, Weinheim 2010. It is clear to the person skilled in the art that the permeability in a mineral oil deposit need not be homogeneous, but generally has a certain distribution, and the statement of the permeability of a mineral oil deposit is accordingly an average permeability.

The mineral oil present in the deposit has a viscosity $\eta_{oil}$ of at least 3 mPa*s, especially at least 10 m Pa*s (measured at the deposit temperature $T_L$). The viscosity depends—in addition to the temperature—on factors including the type of mineral oil. According to the type of oil, it may also be 10 000 mPa*s or more. The viscosity $\eta_{oil}$ is preferably up to 30 000 mPa*s, more preferably 100 to 10 000 mPa*s and most preferably 20 mPa*s to 1000 mPa*s (in each case measured at $T_L$).

In addition to the oil, the mineral oil formation comprises deposit water with a greater or lesser salt content. The salts in the deposit water may especially be alkali metal salts and alkaline earth metal salts. Examples of typical cations comprise $Na^+$, $K^+$, $Mg^{2+}$ or $Ca^{2+}$, and examples of typical anions comprise chloride, bromide, hydrogencarbonate, sulfate or borate. According to the invention, the salt content of the deposit water is 20 000 ppm to 350 000 ppm (parts by weight based on the sum of all components of the deposit water), for example 100 000 ppm to 250 000 ppm. The amount of alkaline earth metal ions, especially of $Mg^{2+}$ and $Ca^{2+}$ ions, may be 1000 to 53 000 ppm.

In general, the deposit water comprises one or more alkali metal ions, especially $Na^+$ ions. In addition, it is also possible for alkaline earth metal ions to be present, in which case the weight ratio of alkali metal ions/alkaline earth metal ions is generally ≥2, preferably ≥3. The anions present are generally at least one or more than one halide ion, especially at least chloride ions. In general, the amount of $Cl^-$ is at least 50% by weight, preferably at least 80% by weight, based on the sum of all anions.

Glucans Used

"Glucans" are understood by the person skilled in the art to mean homopolysaccharides formed exclusively from glucose units. According to the invention, a specific class of glucan is used, specifically those glucans which comprise a main chain formed from β-1,3-glycosidically bonded glucose units, and side groups which are formed from glucose units and are β-1,6-glycosidically bonded thereto. The side groups preferably consist of a single β-1,6-glycosidically attached glucose unit, with—viewed statistically—every third unit of the main chain β-1,6-glycosidically bonded to a further glucose unit.

Fungal strains which secrete such glucans are known to those skilled in the art. Examples comprise *Schizophyllum commune, Sclerotium rolfsii, Sclerotium glucanicum, Monilinia fructigena, Lentinula edodes* or *Botrygs cinera*. Suitable fungal strains are specified, for example, in EP 271 907 A2 and EP 504 673 A1, claim 1 of each. The fungal strains used are preferably *Schizophyllum commune* or *Sclerotium rolfsii* and more preferably *Schizophyllum commune*, which secretes a glucan in which, on a main chain formed from β-1,3-glycosidically bonded glucose units—viewed statistically—every third unit of the main chain is β-1,6-glycosidically bonded to a further glucose unit; in other words, the glucan is preferably what is called *schizophyllan*. Typical *schizophyllans* have a weight-average molecular weight $M_w$ of approx. 1.5 to approx. $25*10^6$ g/mol, especially 2 to approx. $15*10^6$ g/mol.

The production of such glucans is known in principle. For production, the fungi are fermented in a suitable aqueous nutrient medium. In the course of fermentation, the fungi secrete the abovementioned class of glucans into the aqueous fermentation broth, and an aqueous polymer solution can be removed from the aqueous fermentation broth.

Processes for fermenting such fungal strains are known in principle to those skilled in the art, for example from EP 271 907 A2, EP 504 673 A1, DE 40 12 238 A1, WO 03/016545 A2 and "Udo Rau, *"Biosynthese, Produktion and Eigenschaften von extrazellulären Pilz-Glucanen"*, *HabRationsschrift Technische Universität Braunschweig*, Shaker Verlag Aachen 1997", each of which also mentions suitable nutrient media. The fermentation systems may be continuous or batchwise systems.

An aqueous solution comprising glucans is ultimately removed from the fermentation broth which comprises dissolved glucans and biomass (fungal cells, with or without cell constituents), leaving an aqueous fermentation broth in which the biomass has a higher concentration than before. The removal can especially be effected by means of single-stage or multistage filtration, or by means of centrifugation. It will be appreciated that it is also possible to combine several removal steps with one another.

In the removal, it should be ensured that the biomass is very substantially retained. Biomass remaining in the filtrate can block fine pores of the mineral oil formation. The quality of the filtrate can be determined in a manner known in principle by means of the millipore filtration ratio (MPFR). The test method is outlined in EP 271 907 B1, page 11, lines 24 to 48. The MPFR of the filtrates should be at a minimum, and especially 1.001 to 3, preferably 1.01 to 2.0.

The filtration can preferably be undertaken by means of crossflow filtration, especially crossflow microfiltration. The crossflow microfiltration process is known in principle to the person skilled in the art and is described, for example, in "Melin, Rautenbach, *Membranverfahren [Membrane processes]*, Springer-Verlag, 3rd edition, 2007, page 309 to page 366". "Microfiltration" is understood by the person skilled in the art here to mean the removal of particles of a size between approx. 0.1 μm and approx. 10 μm.

In crossflow filtration—for example by means of a suitable circulation pump—a flow of liquid to be filtered is applied in parallel to the surface of the membrane used as the filtration material. There is a thus a constant liquid flow over the filter membrane, and this prevents or at least reduces the formation of deposits on the membrane surface.

The filtrate obtained can preferably be used as such for the process according to the invention. It can, however, for example, be concentrated further, or the glucan can be removed from the solution and isolated in solid form, for example by precipitation by means of suitable solvent, followed by drying.

The fermentations should preferably be run such that the concentration of the glucans to be produced in the fermentation broth to be filtered is more than 3 g/l, preferably at least 5 g/l and more preferably at least 8 g/l. The concentration may especially be 5 g/l to 30 g/l and, for example, 8 g/l to 20 g/l.

Process Step (1)

To execute the invention, in a first process step (1), a concentrate (K) of a glucan of the structure outlined above in water with a concentration of more than 3 g/l to 30 g/l is provided. More particularly, the concentration of the concentrate (K) is 5 g/l to 30 g/l, preferably 5 g/l to 25 g/l, more preferably 8 g/l to 22 g/l and, for example, 10 g/l to 20 g/l.

In a first embodiment of the invention, such a concentrate (K) can be produced by dissolving solid glucan in the desired concentration. In this embodiment of the invention, the concentrate can advantageously be produced on site, i.e. on the oil field or at least close to the oil field. For this purpose, solid glucans are supplied as a dry product, for example in big bags. Solid glucans can especially be produced by the method outlined above. For dissolution, the powder can be added, for example manually or via a conveyor belt, through a funnel, into a stirred tank together with water. To improve the wetting and the dissolving operation, it is additionally possible to add a surfactant.

The water used for dissolution may be fresh water or salt-containing water, for example fresh water taken from groundwater horizons, or deposit water. In offshore applications, it is possible to dissolve using especially seawater or processed seawater, i.e. seawater from which some minerals and/or sulfur compounds have been removed. When the presence of particles in the water is expected, it should be filtered.

In a second embodiment of the invention, the production of concentrate (K) is undertaken by fermenting fungal strains which secrete glucans of the structure mentioned in an aqueous nutrient medium, and removing an aqueous solution of the glucan formed with a concentration of more than 3 g/l from the aqueous fermentation broth comprising glucans and biomass. Details of the production method and preferred production methods have already been described above. The filtrate is used as such for the process. In other words, in this method, a concentrate (K) is obtained from the fermentation broth without isolating solid glucans. This avoids quality losses which can occur as a result of the isolation of a high molecular polymer and the redissolution of the high molecular weight polymer.

In this embodiment, the production of the concentrate can take place on the oil field or close to the oil field, or it can take place in a production facility remote from the oil field. When the production of the glucan takes place in a production facility remote from the oil field, the concentrate (K) obtained is subsequently transported to the oil field. In order to save transport expenditure, the concentration of the concentrate (K) is preferably at least 5 g/l and more preferably at least 8 g/l. The concentration may especially be 5 g/l to 25 g/l and, for example, 8 g/l to 22 g/l.

The concentrates (K) obtained can be stored intermediately before further processing in suitable liquid stores, for example tanks.

Process Step (2)

In process step (2), the aqueous formulation (F) intended for injection is produced by diluting the concentrate (K) provided in step (1) with water. It is optionally possible in this step to add further additives, for example biocides or oxygen scavengers.

The production of the aqueous formulation (F) is undertaken on site, i.e. on the oil field or at least close to the oil field. Larger oil fields on land frequently have central plants in which the oil produced is processed and stored. Mineral oil produced is supplied from the individual production sites to the central processing plants by pipeline, and the water-oil separation is undertaken there. It is likewise possible to convey liquids to be injected, in the simplest case deposit water removed, from the central plant in pipelines to the injection boreholes. Such central plants should also be classified as "on site". In the case of offshore platforms, "production on site" means of course that the production is on the platform.

For dilution, it is possible to use fresh water, or else water comprising salts. It will be appreciated that there may also be mixtures of different salts.

In one embodiment of the invention, seawater or partly desalinated seawater can be used to dilute the concentrate (K). In a further embodiment of the invention, produced deposit water can be used, which is reused in this manner. In the case of production platforms at sea, the formulation is generally diluted with seawater or with partly desalinated seawater.

The total amount of all salts in the aqueous formulation (F) is guided by the type of water used to make up and to dilute the concentrate (K). The amount of the salts may be up to 350 000 ppm (parts by weight), based on the sum of all components of the formulation. Such high values can be achieved when deposit water with a high salt content is used both to make up and to dilute the concentrate (K). In general, the salinity of the formulation (F) is 20 000 ppm to 350 000 ppm, especially 20 000 ppm to 250 000 ppm. When seawater is used to dilute the concentrate (K), the salt content is generally 20 000 ppm to 50 000 ppm and, when formation water is used, generally 100 000 ppm to 250 000 ppm. The amount of alkaline earth metal ions may especially be 1000 to 53 000 ppm. When alkali metal and alkaline earth metal ions are present, the weight ratio of alkali metal ions/alkaline earth metal ions is generally ≥2, preferably ≥3. The anions present are generally at least one or more than one of the halide ions, especially at least $Cl^-$. In general, the amount of $Cl^-$ is at least 50% by weight, preferably at least 80% by weight, based on the sum of all anions.

The use concentration of the aqueous formulation (F) is 0.05 g/l to 3 g/l, preferably 0.08 g/l to 0.5 g/l, and more preferably 0.1 g/l to 0.4 g/l.

The viscosity $\eta_F$ of the aqueous formulation (F) is, according to the invention, at least 3 mPa*s, preferably at least 10 mPa*s (in each case measured at 7 $s^{-1}$ and $T_L$), the viscosity of the aqueous formulation $\eta_F$ being selected in comparison to the viscosity of the $\eta_{oil}$ (measured at $T_L$) such that $\eta_F \leq \eta_{oil}$. The viscosity of the aqueous formulation may thus quite possibly be smaller than the viscosity of the oil phase. Even when the aqueous formulation (F) has a lower viscosity than the oil phase, it is already possible to achieve an increase in the oil yield compared to the use of pure water. In one embodiment of the invention, $\eta_F < \eta_{oil}$ and, in a further embodiment of the invention, $\eta_F$ is in the range from 0.1 $\eta_{oil}$ to 0.99 $\eta_{oil}$. The desired viscosity can be established easily via the concentration of the glucan.

In addition to the components mentioned so far, the aqueous formulation (F) may comprise additional components or additives.

Examples of additional components comprise one or more biocides which can be added to prevent polymer degradation by microorganisms. In addition, oxygen scavengers, for example sodium bisulfite, can be added. In a further variant, it is additionally possible to add basic compounds, for example alkali metal hydroxides.

Further examples of additional components comprise thickening polymers which are chemically different from the glucans used, for example synthetic polymers or biopolymers.

In addition, additional components may be surfactants, especially nonionic, anionic or zwitterionic surfactants. The addition of surfactants allows the deoiling action to be enhanced further. Surfactants reduce the interfacial tension between the aqueous phase and the oil phase and thus enable additional mobilization of mineral oil. In a preferred embodiment of the invention, they are anionic and/or nonionic surfactants.

These may in principle be any nonionic, anionic or zwitterionic surfactants, preferably nonionic and/or anionic surfactants, provided that they are suitable in principle for tertiary mineral oil production. The person skilled in the art is aware of corresponding surfactants. Suitable surfactants for tertiary mineral oil production comprise, as hydrophobic molecular moieties, especially hydrocarbyl radicals, preferably aliphatic radicals having 10 to 36 carbon atoms, preferably 12 to 36 carbon atoms and more preferably 16 to 36 carbon atoms.

Examples of such surfactants comprise anionic surfactants with sulfo groups, such as olefinsulfonates such as α-olefinsulfonates or i-olefinsulfonates, paraffin sulfonates or alkylbenzenesulfonates, nonionic surfactants such as alkyl polyalkoxylates, especially alkyl polyethoxylates, alkyl polyglucosides. One example of zwitterionic surfactants is alkylamidopropyl betaines. The surfactants may also be those which comprise both nonionic hydrophilic groups and anionic hydrophilic groups, for example alkyl ether sulfonates, alkyl ether sulfates or alkyl ether carboxylates.

In addition, the surfactants may also be oligomeric or polymeric surfactants. Examples of such polymeric surfactants comprise amphiphilic block copolymers which comprise at least one hydrophilic block and at least one hydrophobic block. Examples comprise polypropylene oxide-polyethylene oxide block copolymers, polyisobutene-polyethylene oxide block copolymers, and comb polymers with polyethylene oxide side chains and a hydrophobic main chain, the main chain preferably comprising essentially olefins or (meth)acrylates as structural units.

The polymers and surfactants mentioned may be constituents of the formulation (F), but they may also be injected separately from the formulation (F) in the form of aqueous formulations.

To execute process step (2), the concentrate (K), the water used for dilution and further, optionally used components or additives, are mixed with one another. This is generally done using one or more suitable mixers, for example static mixers or dynamic mixers. Preference is given to performing process step (2) using one or more static mixers. The formulation (F) can optionally be filtered once more before use in order to free the solution of any agglomerates or coarse particles still present. This should prevent blockage of the mineral oil formation.

In this case, process step (2) should be undertaken such that oxygen introduction into the aqueous formulation (F) should be suppressed if possible or at least greatly reduced. Introduced oxygen can cause or at least promote a reduction in viscosity under some circumstances under the conditions of the formation. In a preferred embodiment of the invention, process step (2) should therefore be performed under oxygen-free conditions. This can be achieved in particular by use of closed apparatuses, and optionally the use of protective gas. The oxygen content in the formulation (F) before injection should preferably not exceed 50 ppb. Any oxygen introduced in spite of this can be removed by addition of oxygen binders to the formulation (F).

Process Step (3)

In process step (3), the aqueous formulation (F) is injected into the mineral oil formation, and crude oil is withdrawn through at least one production borehole.

The injection of the inventive aqueous formulation can be undertaken by means of customary apparatus. The formulation can be injected into the mineral oil formation by means of customary pumps through one or more injection boreholes. The injection can preferably be effected with positive displacement pumps. In this case, pressures of several 10 s up to more than 100 bar may occur at the borehole head. It should be noted here that legal regulations exist in various countries, which limit the injection pressure on entry into the rock formation to 1.1 times the original deposit pressure. This limit is intended to prevent artificial breakup of the rock formation.

The injection boreholes are typically lined with steel tubes cemented in place, and the steel tubes are perforated at the desired point. The formulation enters the mineral oil formation from the injection borehole through the perforation. The pressure applied by means of the pumps, in a manner known in principle, fixes the flow rate of the formulation and hence also the shear stress with which the aqueous formulation enters the formation. The shear stress on entry into the formation can be calculated by the person skilled in the art in a manner known in principle on the basis of the Hagen-Poiseuille law using the area flowed through on entry into the formation, the mean pore radius and the volume flow rate. The average permeability of the formation can be determined in a manner known in principle by measurements on drill cores. Of course, the greater the volume flow rate of aqueous formulation (F) injected into the formation, the greater the shear stress.

The rate of injection can be determined by the person skilled in the art according to the conditions in the formation. Preferably, the shear rate on entry of the aqueous polymer formulation into the formation is at least 30 000 s$^{-1}$, preferably at least 60 000 s$^{-1}$ and more preferably at least 90 000 s$^{-1}$.

The crude oil produced through the production boreholes can be processed in a manner known in principle to the person skilled in the art. More particularly, the crude oil is separated into a phase comprising essentially deposit water and a phase comprising essentially oil. The oil can subsequently be transported into a refinery. The deposit water removed can subsequently be freed of oil residues in a further workup step. This may be required especially offshore, when the water is subsequently to be released into the sea.

In a preferred embodiment, at least a portion of the deposit water removed is used to dilute the concentrate (K) in process step (2). This allows a substantially closed water circuit to be realized.

The process according to the invention can be effected at different times in a deposit development. For example, the process according to the invention can be performed after water flooding. In addition, it can be performed after a surfactant flooding of the deposit. Surfactant flooding involves injecting a suitable aqueous formulation of surfactants into the formation. The reduction in the water-oil interfacial tension allows surfactants to promote the mobilization of mineral oil. However, it is also possible to perform the process directly after the end of primary mineral oil production, i.e. without performing water flooding beforehand, or—if primary production is not possible due to the circumstances in the deposit—directly after the development of the deposit. Dispensing with water flooding allows fingering or excessive fingering to be avoided from the outset under some circumstances.

The cumulative mineral oil production from a mineral oil deposit which can be achieved under economic considerations is also referred to as the final yield. This final yield divided by the total amount of oil originally present in the mineral oil deposit (=initial oil content) is also referred to as the final yield level or yield factor.

By means of the process according to the invention, it is still possible, using glucans, even in very hot and highly saline mineral oil deposits, to achieve a significant increase in the mineral oil yield when customary polymers for tertiary mineral oil production already no longer lead to satisfactory results.

The examples which follow are intended to illustrate the invention in detail:

For the tests which follow, the following thickening polymers were used:

Polymer 1

Glucan with a β-1,3-Glycosidically Bonded Main Chain and β-1,6-Glycosidically Bonded Side Groups (Inventive)

The apparatus used to produce the glucan is shown in FIG. 1. It consisted of a stirred jacketed reservoir vessel B1 with a volume of 120 liters, the eccentric screw pump P1, the tube bundle heat exchanger W1, the pressure-retaining valve V1 and the two filter modules F1 and F2. The filter modules F1 and F2 were backflushed by means of the three-way taps V3 and V4, with permeate at intervals of 300 s in each case, with 200 ml of permeate in each case; the nitrogen pressure was 7 bar. By means of the jacket of the vessel B1 and the heat exchanger W1, the contents of the crossflow filtration system were cooled to 24° C.

In the filter modules F1 and F2, a symmetrical tubular membrane was used, specifically a 5-channel element from TAMI composed of ATZ ceramic (alumina/titania/zirconia). The pore size D90 of the membrane was 3.5 μm. The membrane was of symmetric structure and did not have a separating layer or intermediate layers. The length of the membrane tube was 1 m; the external diameter was 20 mm. The membrane area of a module element was 0.11 m². The hydraulic diameter of a channel was 6 mm.

For the tests, *Schizophyllum commune* was used; specifically, the *schizophyllan* as described in "Udo Rau, *Biopolymers*, ed. A. Steinbüchel, Verlag WILEY-VCH, Volume 6, pages 63 to 79" was produced in a batch fermentation. The fermentation time was 96 hours. 99.6 kg of this fermentation broth (=feed) were introduced into vessel B1 (FIG. 2) and circulated at a circulation rate of 7 m³/h by means of the pump P1 at pressure 4 bar for 45 minutes. The contents of the vessel were analyzed and a content of 9.8 grams of *schizophyllan* per liter was found.

Then the circulation rate was adjusted to 5.1 m³/h and a transmembrane pressure of 1.1 bar was applied. The throughflow rate was 5 m/s. The permeate leaving the filter modules was collected and weighed. During the first 10 minutes of the experiment, 0.75 kg of permeate was obtained. This corresponds to a permeate flow rate of 20.4 kg/h/m². The transmembrane pressure was 2.9 bar. The filtration was operated for 16 hours and in this time 6.18 kg of permeate were obtained.

The collected permeate was analyzed and a glucan content of 6.7 grams per liter was found. The MPFR of the permeate was 2.8.

The concentrate obtained was diluted to the temperature desired in each case for the tests.

Comparative Polymer 1:

Commercial synthetic polymer formed from approx. 75 mol % of acrylamide and 25 mol % of the sulfo-containing monomer 2-acrylamido-2-methylpropanesulfonic acid (sodium salt), weight-average molecular weight $M_w$ of approx. 11 million g/mol Comparative polymer 2:

Commercial biopolymer xanthan (CAS 11138-66-2) (biopolymer produced by fermentation with the bacterium *Xanthamonas Campestris*) with a weight-average molecular weight $M_w$ of approx. 2 million g/mol.

Comparative polymer 3:

Commercial biopolymer diutan (biopolymer produced by fermentation with *Sphingomonas* sp.)

The inventive glucans and the comparative polymers were used to perform the viscosity measurements described hereinafter.

Performance of the Viscosity Measurements:

Test instrument: shear stress-controlled Physica MCR301 rotary viscometer pressure cell with double-gap geometry DG 35/PR/A1

Measurement range: 25 to 170° C., as specified in each case

Shear rate: as specified in each case

The complete measurement system including the syringe with which the sample is taken and introduced into the rheometer was purged with nitrogen. During the measurement, the test cell was pressurized with 8 bar of nitrogen.

Test Series 1:

The viscosity of solutions of the polymers P1, V1 and V2 was measured at different concentrations of 0.2 g/l to 2 g/l. The measurements were carried out in synthetic deposit water. For this purpose, the polymers were dissolved in superconcentrated salt water or—in the case that the polymer is already present as solution—a solution of the polymer is mixed with superconcentrated salt water, and the resulting salt solution is subsequently diluted so as to give the concentrations stated below. The measurements of P1 and V2 was performed at 54° C., and the measurement of V1 at 40° C.

Composition of the deposit water (per liter):

| | |
|---|---|
| $CaCl_2$ | 42 600 mg |
| $MgCl_2$ | 10 500 mg |
| NaCl | 132 000 mg |
| $Na_2SO_4$ | 270 mg |
| $NaBO_2 \cdot 4\,H_2O$ | 380 mg |
| Total salinity | 185 750 mg |

Figure 2:
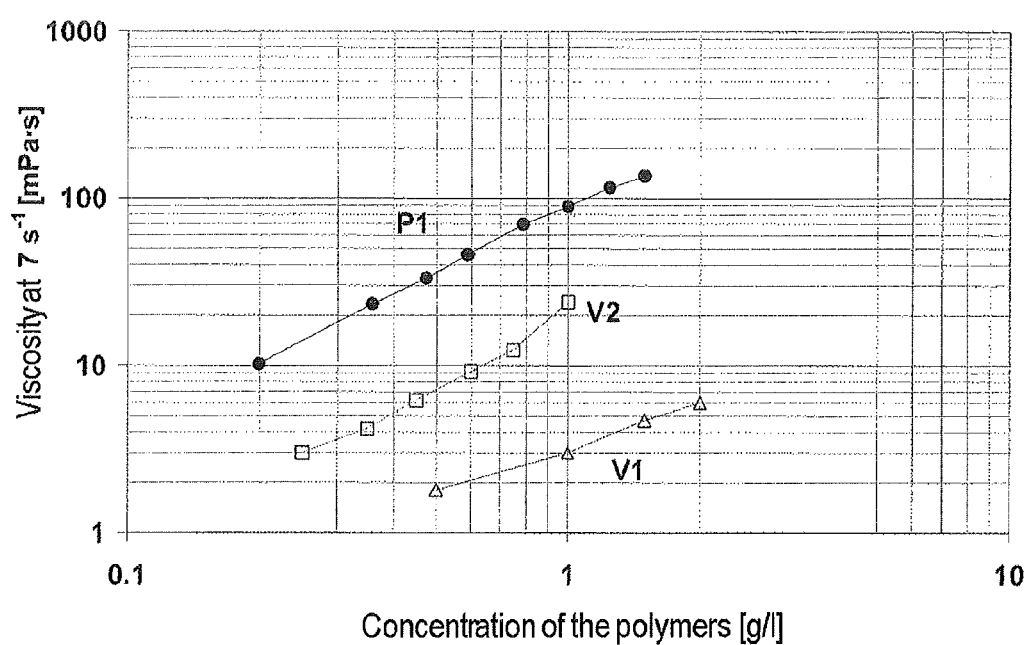
FIG. 2 is a graph showing the dependence of the viscosity of the polymers P1, V1 and V2 on the concentration.

The results are compiled in FIG. 2. FIG. 2 shows that glucan P1 achieves the best viscosity efficiency in deposit water, i.e. the samples give the highest viscosity at a given concentration.

Figure 3:
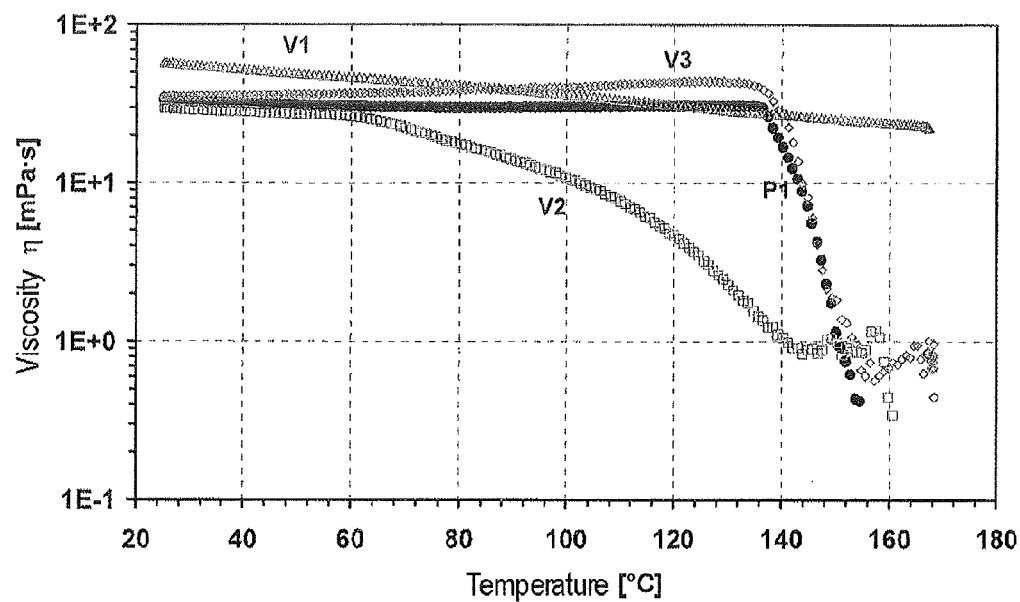
FIG. 3 is a graph showing the temperature dependence of the viscosity of the polymers P1, V1, V2 and V3 in ultrapure water.

Test Series 2:

The viscosity of aqueous solutions of the polymers P1, V1, V2 and V3 in ultrapure water were measured in a concentration of in each case 3 g/l at a shear rate of 100 s$^{-1}$ within the temperature range from 25° C. to 170° C. For this purpose, the solution of polymer P1 was diluted correspondingly, and polymers V1, V2 and V3 were dissolved in the corresponding concentration in water. The samples were injected into the test cell at room temperature and the heating rate was 1° C./min. The results are shown in FIG. 3.

Test Series 3:

The procedure was as in test series 1, except that the solutions were made up not using ultrapure water but rather synthetic deposit water. The results are compiled in FIG. 4.

Comment for Test Series 2 and 3:

The tests show the advantages of the glucan P1 used in accordance with the invention compared to the comparative polymers V1, V2 and V3 at high temperature and high salt concentration. The viscosity of the glucan P1 remains constant both in salt-containing water and in ultrapure water at temperatures of 25 to 140° C., and only then begins to decrease gradually. In ultrapure water, both the synthetic polymer V1 (copolymer of acrylamide and 2-acrylamido-2-methylpropanesulfonic acid) and the biopolymer V3 exhibits similar behavior, while the biopolymer V2 is much worse. In deposit water, however, all comparative polymers V1, V2 and V3 are worse than the glucan P1 at relatively high temperatures.

Test Series 4:

The viscosity of polymers P1, V1 and V1 as a function of shear rate was measured in the presence of various salts and different amounts of salts, specifically

| | |
|---|---|
| 4-1 | 0.1 g/l NaCl |
| 4-2 | 120 g/l NaCl |
| 4-3 | 0.1 g/l CaCl$_2$ |
| 4-4 | 120 g/l CaCl$_2$ |
| 4-5 | deposit water of the above composition |

Polymer concentration: in each case 3 g/l
Measurement temperature: 25° C.
Instrument: shear stress-controlled Physica MCR Couette Geometrie CC 27 rotary viscometer
Radius of the test body: 13.33 mm
Radius of the test cup: 14.46 mm The samples were tested at steady-state shear beginning at high shear rates down to low shear rates and back again.

The results are compiled in FIGS. 5 to 9.

In low-salinity water, all polymers exhibit a decrease in the viscosity with increasing shear rate. For all tests, polymer P1 is better than comparative polymers V1 and V2, i.e. the viscosity efficiency of polymer P1 is the best.

In high-salinity water and deposit water, the viscosity of the two biopolymers P1 and V2 remains about the same, while the viscosity of the synthetic polymer V1 (copolymer of acrylamide and 2-acrylamido-2-methylpropanesulfonic acid) is reduced very greatly.

Figure 10:
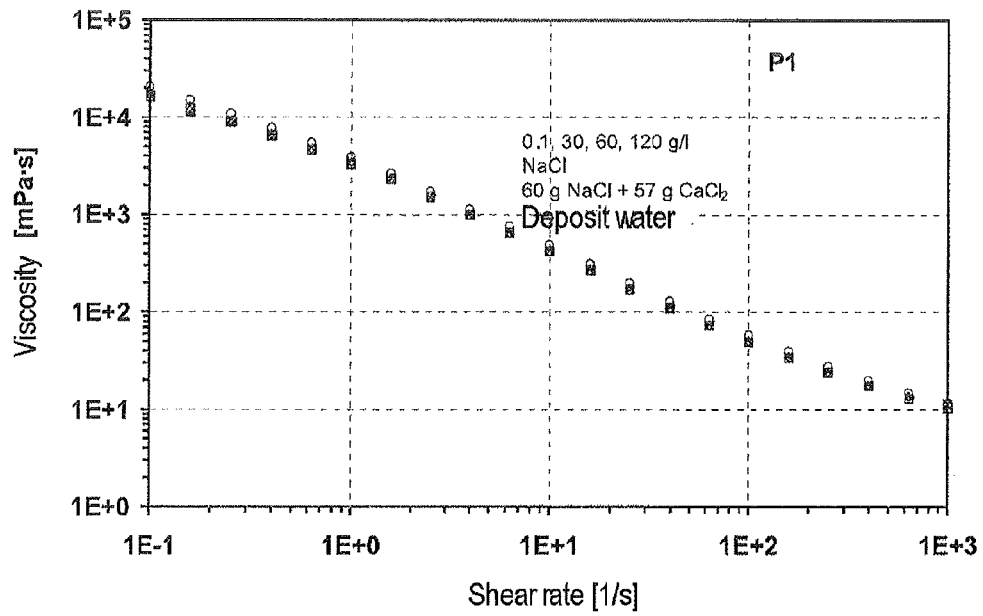
FIG. 10 is a graph showing the viscosity of polymer P1 at different salt concentrations.
Figure 11:
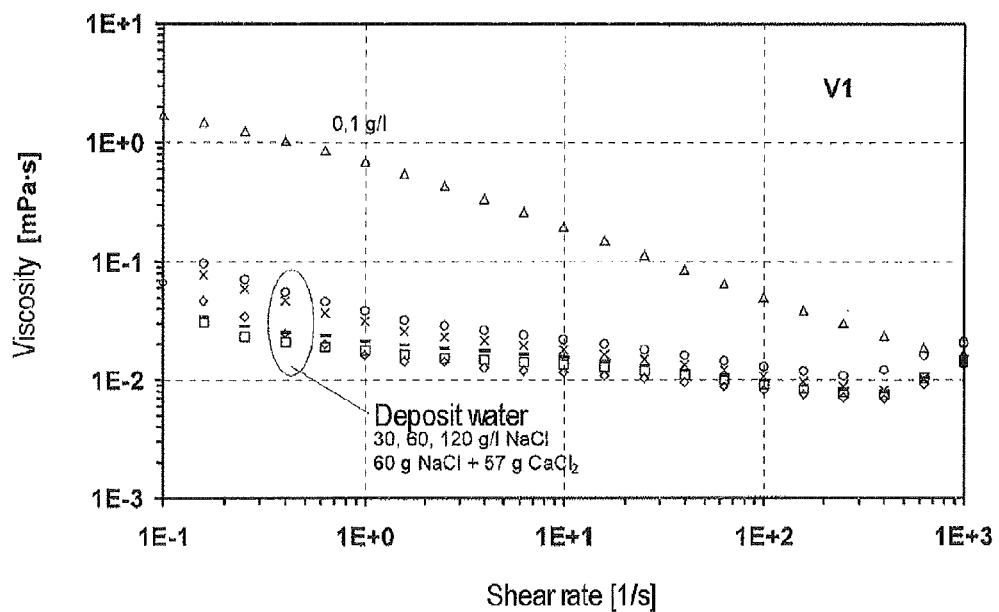
FIG. 11 is a graph showing the viscosity of polymer V1 at different salt concentrations.

Test Series 5:

In addition, the viscosity of polymers P1 and V1 was measured as a function of the shear rate at different amounts of salt, specifically 0.1 g/l NaCl, 30 g/l NaCl, 60 g/l NaCl, 120 g/l NaCl, a mixture of 60 g/l NaCl and 57 g/l CaCl$_2$, and deposit water of the above composition. The test series are shown in FIGS. 10 and 11. The viscosity of polymer P1 is independent of the salt content, while the viscosity of polymer V1 is reduced very greatly even at a salt content of 30 g/l NaCl (corresponds roughly to seawater).

LIST OF FIGURES

FIG. 1 schematic diagram of the apparatus used to prepare the glucan P1

Figure 4:
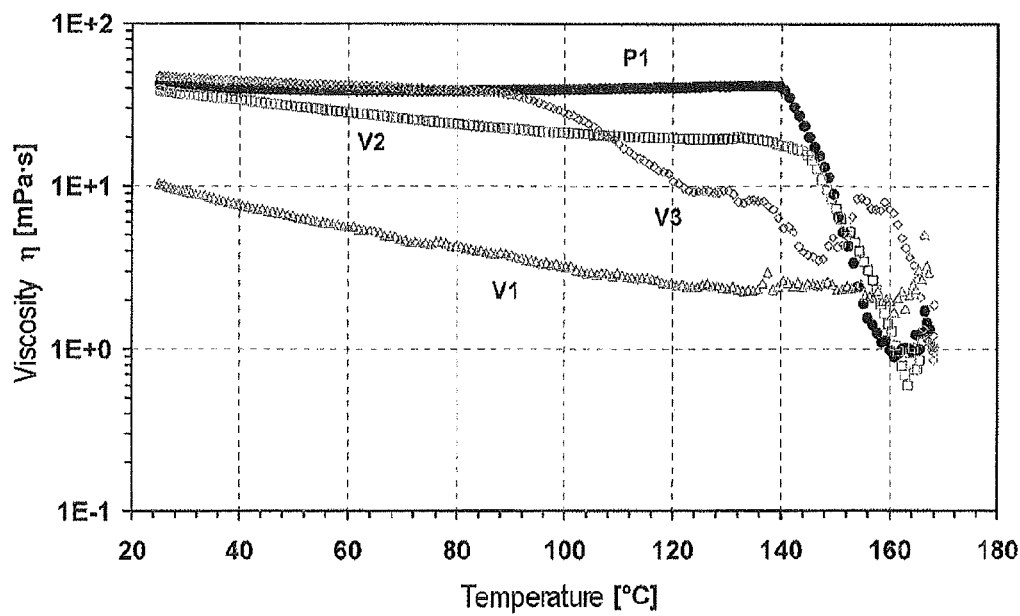
FIG. 4 is a graph showing the temperature dependence of the viscosity of the polymers P1, V1, V2 and V3 in deposit water.
Figure 5:
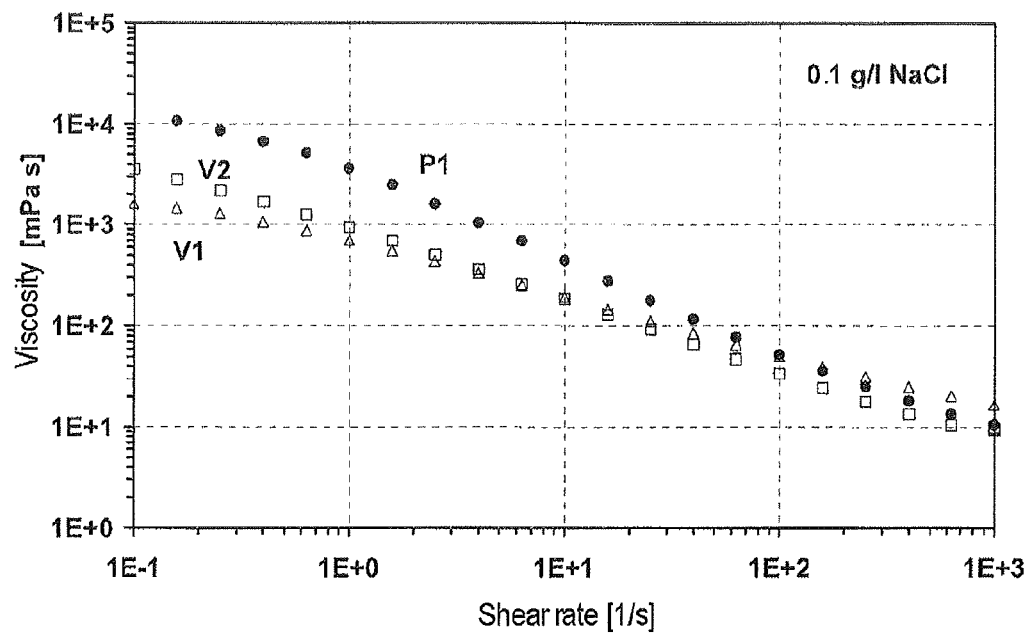
FIG. 5 is a graph showing the viscosity of polymers P1, V1 and V2 in low-salinity water (0.1 g/l NaCl) as a function of shear rate.
Figure 6:
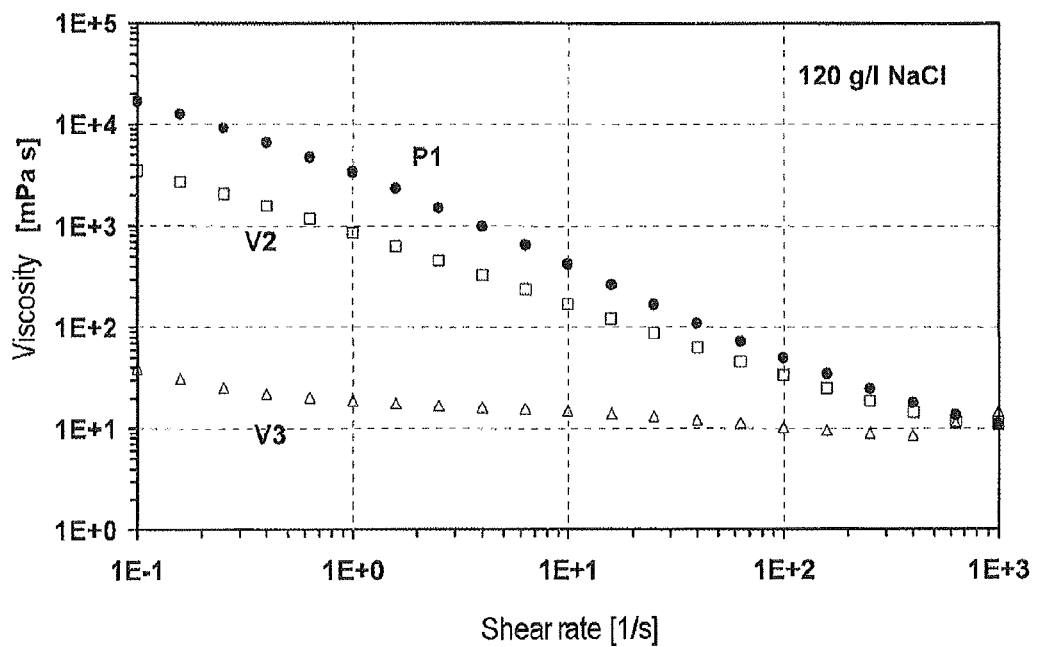
FIG. 6 is a graph showing the viscosity of polymers P1, V1 and V2 in high-salinity water (120 g/l NaCl) as a function of shear rate.
Figure 7:
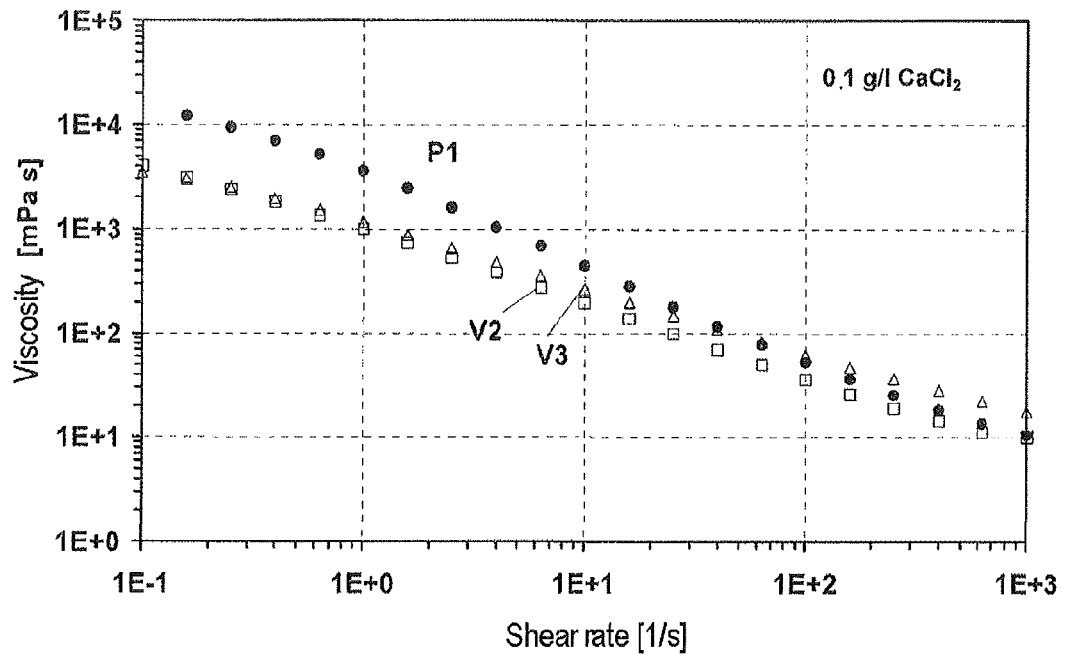
FIG. 7 is a graph showing the viscosity of polymers P1, V1 and V2 in low-salinity water (0.1 g/l NaCl) as a function of shear rate.
Figure 8:
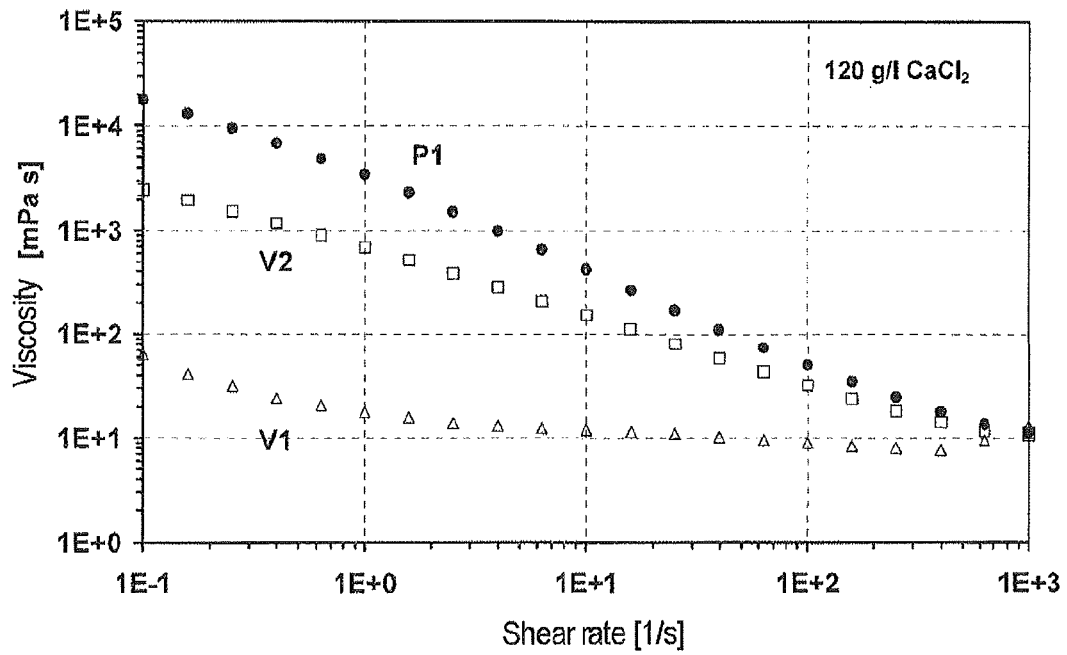
FIG. 8 is a graph showing the viscosity of polymers P1, V1 and V2 in high-salinity water (120 g/l NaCl) as a function of shear rate.
Figure 9:
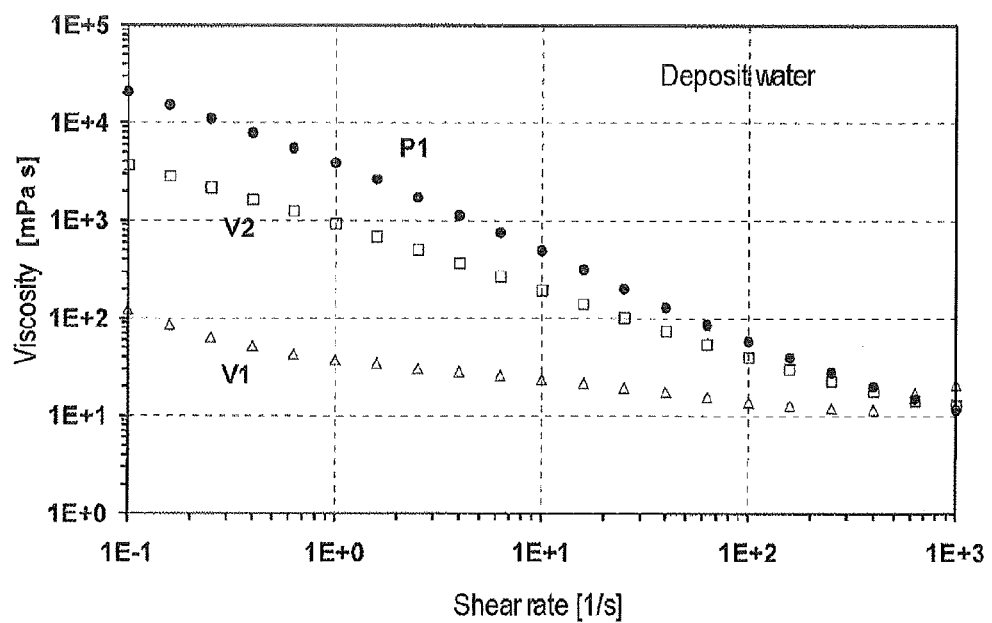
FIG. 9 is a graph showing the viscosity of polymers P1, V1 and V2 in high-salinity water (deposit water) as a function of shear rate.

FIG. 2 dependence of the viscosity of the polymers P1, V1 and V2 on the concentration FIG. 3 temperature dependence of the viscosity of the polymers P1, V1, V2 and V3 in ultrapure water FIG. 4 temperature dependence of the viscosity of the polymers P1, V1, V2 and V3 in deposit water FIG. 5 viscosity of polymers P1, V1 and V2 in low-salinity water (0.1 g/l NaCl) as a function of shear rate FIG. 6 viscosity of polymers P1, V1 and V2 in high-salinity water (120 g/l NaCl) as a function of shear rate FIG. 7 viscosity of polymers P1, V1 and V2 in low-salinity water (0.1 g/l CaCl$_2$) as a function of shear rate FIG. 8 viscosity of polymers P1, V1 and V2 in high-salinity water (120 g/l CaCl$_2$) as a function of shear rate FIG. 9 viscosity of polymers P1, V1 and V2 in high-salinity water (deposit water) as a function of shear rate FIG. 10 viscosity of polymer P1 at different salt concentrations FIG. 11 viscosity of polymer V1 at different salt concentrations

The invention claimed is:

1. A process for mineral oil production from a deposit with a deposit temperature $T_L$ of at least 70° C., wherein the process comprises at least the following process steps:
    (1) providing a concentrate (K) of at least one glucan with a β-1,3-glycosidically bonded main chain, and side groups β-1,6-glycosidically bonded thereto and having a weight-average molecular weight $M_w$ of 1.5*10$^6$ to 25*10$^6$ g/mol, in water with a concentration of more than 3 g/l to 30 g/l,
    (2) preparing an aqueous formulation (F) comprising the at least one glucan by diluting the concentrate (K) provided in step (1) on site with water to a glucan concentration of 0.05 g/l to 3 g/l, with the proviso that the concentration is selected such that the viscosity $\eta_F$ measured at 7 s$^{-1}$ and $T_L$ of the aqueous formulation (F) is at least 3 mPa*s, the viscosity $\eta_F$ being selected in comparison to the viscosity $\eta_{oil}$ measured at $T_L$ such that $\eta_F \leq \eta_{oil}$, and
    (3) injecting the aqueous formulation (F) into the mineral oil formation through at least one injection borehole and withdrawing crude oil from the deposit through at least one production borehole,
    wherein said deposit comprises oil and deposit water with a salinity of 20 000 ppm to 350 000 ppm, and wherein said oil has a viscosity $\eta_{oil}$ measured at $T_L$ of at least 3 mPa*s.

2. The process according to claim 1, wherein the deposit temperature is 70° C. to 150° C.

3. The process according to claim 1, wherein the deposit temperature is 100° C. to 135° C.

4. The process according to claim 1, wherein the concentration of the glucan in the concentrate (K) is 5 g/l to 25 g/l.

5. The process according to claim 1, wherein the concentration of the glucan in the aqueous formulation (F) is 0.08 g/l to 0.5 g/l.

6. The process according to claim 1, wherein the aqueous formulation (F) further comprises salts in an amount of 20 000 ppm to 350 000 ppm.

7. The process according to claim 6, wherein the proportion of alkali earth metal ions in the formulation (F) is 1000 to 53 000 ppm.

8. The process according to claim 1, wherein the dilution in step (2) is undertaken with seawater.

9. The process according to claim 1, wherein the dilution in step (2) is undertaken with produced deposit water.

10. The process according to claim 1, wherein the viscosity of the oil $\eta_{oil}$ measured at $T_L$ is 100 mPa*s to 10000 mPa*s.

11. The process according to claim 1, wherein $\eta_F < \eta_{oil}$.

12. The process according to claim 11, wherein the viscosity $\eta_F$ is in the range from 0.1 $\eta_{oil}$ to 0.99 $\eta_{oil}$.

13. The process according to claim 1, wherein the average permeability of the formation is 10 millidarcies to 4 darcies.

14. The process according to claim 1, wherein the average permeability of the formation is 100 millidarcies to 2 darcies.

15. The process according to claim 1, wherein polymer solution is injected into the formation with a shear rate of at least 30 000 s$^{-1}$.

16. The process according to claim 1, wherein the formulation (F) further comprises at least one biocide.

17. The process according to claim 1, wherein the formulation (F) further comprises at least one oxygen scavenger.

18. The process according to claim 1, wherein the process further comprises the injection of surfactants, in which case said surfactants may be a component of the formulation (F) or an aqueous surfactant formulation is additionally injected.

19. The process according to claim 1, wherein the process further comprises the injection of further polymers other than the glucans, in which case the further polymers may be a component of formulation (F) or an aqueous polymer formulation is additionally injected.

20. The process according to claim 1, wherein process step (2) is performed under oxygen-free conditions.

21. The process according to claim 1, wherein the crude oil produced is separated into a phase comprising essentially oil and a phase comprising essentially deposit water.

22. The process according to claim 21, wherein at least a portion of the deposit water removed is used to dilute the concentrate (K).

23. The process according to claim 1, wherein the process is performed after water flooding of the deposit.

24. The process according to claim 1, wherein the process is performed after surfactant flooding of the deposit.

25. The process according to claim 1, wherein the production of the concentrate (K) is undertaken by fermenting fungal strains which secrete glucans of the structure mentioned in an aqueous nutrient medium, and removing an aqueous solution of the glucan formed with a concentration of more than 3 g/l from the aqueous fermentation broth comprising glucans and biomass.

26. The process according to claim 25, wherein the fungal strains are *Schizophyllum commune* or *Sclerotium rolfsii*.

27. The process according to claim 25, wherein the removal is undertaken by means of crossflow filtration.

* * * * *